United States Patent
Whitsell et al.

(10) Patent No.: US 10,171,496 B2
(45) Date of Patent: Jan. 1, 2019

(54) BEACON SPOOFING PREVENTION

(71) Applicant: Cisco Technology, Inc., San Jose, CA (US)

(72) Inventors: Sean Whitsell, Chapel Hill, NC (US); Cullen Jennings, Calgary (CA); Andrew Biggs, Thornton, CO (US); Patrick Linskey, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 15/000,507

(22) Filed: Jan. 19, 2016

(65) Prior Publication Data

US 2017/0208091 A1 Jul. 20, 2017

(51) Int. Cl.
*H04L 29/06* (2006.01)
*H04W 4/02* (2018.01)
*H04W 64/00* (2009.01)

(52) U.S. Cl.
CPC ...... *H04L 63/1483* (2013.01); *H04L 63/0838* (2013.01); *H04W 4/023* (2013.01); *H04W 64/00* (2013.01)

(58) Field of Classification Search
CPC combination set(s) only.
See application file for complete search history.

(56) References Cited

U.S. PATENT DOCUMENTS

| 7,787,401 | B2 | 8/2010 | Kinder et al. | |
|---|---|---|---|---|
| 9,306,741 | B1* | 4/2016 | Brainard | H04L 63/08 |
| 2001/0000958 | A1* | 5/2001 | Ulrich | G06K 17/0022 340/539.13 |
| 2006/0203823 | A1* | 9/2006 | Jiang | H03M 13/09 370/394 |
| 2006/0271704 | A1* | 11/2006 | Chan | H04Q 11/0478 709/240 |
| 2006/0285507 | A1 | 12/2006 | Kinder et al. | |
| 2007/0192594 | A1* | 8/2007 | Lee | H04L 9/12 713/163 |
| 2009/0041424 | A1* | 2/2009 | Ayaki | G11B 20/00086 386/353 |
| 2009/0287408 | A1* | 11/2009 | Gerdes | G01C 21/3423 701/533 |
| 2010/0015990 | A1* | 1/2010 | Gallagher | H04W 60/02 455/456.1 |
| 2010/0146279 | A1* | 6/2010 | Lu | G06F 13/10 713/172 |
| 2010/0293370 | A1* | 11/2010 | Xiao | H04L 63/061 713/155 |

(Continued)

OTHER PUBLICATIONS

M'Raihi et al., TOTP: Time-Based One-Time Password Algorithm, May 2011, Internet Engineering Task Force.

(Continued)

*Primary Examiner* — Phy Anh Vu (57) ABSTRACT

In one embodiment, a beacon signal is received from a beacon device. Either a mobile device or a server identifies a beacon authentication value from the beacon signal. Either the mobile device or the server calculates a local verification value from a security algorithm. A comparison of the authentication value to the local verification value is performed, and a location service is provided based on the comparison.

18 Claims, 11 Drawing Sheets

(56) References Cited

U.S. PATENT DOCUMENTS

| | | | |
|---|---|---|---|
| 2011/0038479 A1* | 2/2011 | Bilodi | H04L 9/0891 380/45 |
| 2011/0103578 A1* | 5/2011 | Orlando | H04L 9/0637 380/28 |
| 2013/0073873 A1* | 3/2013 | Morioka | H04L 9/003 713/193 |
| 2013/0170432 A1 | 7/2013 | O'Brien et al. | |
| 2013/0223626 A1* | 8/2013 | Edge | H04W 4/06 380/270 |
| 2014/0108539 A1* | 4/2014 | Crawford | H04L 67/24 709/204 |
| 2015/0095129 A1* | 4/2015 | Daigle | G06Q 30/0231 705/14.27 |
| 2016/0055689 A1* | 2/2016 | Raina | G07C 9/00309 340/5.7 |
| 2016/0142936 A1* | 5/2016 | Bressanelli | H04L 12/6418 370/242 |
| 2016/0156638 A1* | 6/2016 | Somani | H04L 63/12 726/7 |

OTHER PUBLICATIONS

Two-Factor Authentication with iBeacon, accessed Sep. 28, 2015, SAASPASS.

Van Rijswijk-Deij, Simple Location-Based One-time Passwords, Bringing Location to the Cloud in a Secure and Way, Accessed Jun. 23, 2015, Radboud University Nijmegen Simple.

* cited by examiner

BEACON SPOOFING PREVENTION

TECHNICAL FIELD

This disclosure relates in general to the field of proximity beacons, and more particularly, to one time passwords for spoofing prevention in proximity beacons.

BACKGROUND

A proximity beacon is a small electronic device that emits a wireless signal that may be detected by electronic devices in the nearby area of the proximity beacon. The proximity beacon may be tied to specific geographic locations or relative locations.

The proximity beacon may push notifications to users in the proximity of the proximity beacon. Advertisements, for example, may be sent to users from a proximity beacon located within or near a store. Alternatively, payments may be triggered through point of sale systems with proximity beacons. Other applications that relate to users being physically near the proximity beacon may be well suited.

The technologies supporting proximity beacons have been developed with low cost and convenience and the forefront, sacrificing security concerns. As a result, proximity beacons may be spoofed by devices that are not actually at the purported physical location. The recorded emitted wireless signal from a proximity beacon may be imitated and re-broadcast at another location by an unauthorized device.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In an embodiment, a method includes receiving a beacon authentication value derived from a beacon signal emitted from a beacon device, calculating a local verification value from a security algorithm, and performing a comparison of the beacon authentication value to the local verification value. A location service based on the comparison.

In an embodiment, a beacon authentication value is generated from a seed value and a clock. A beacon signal including the beacon authentication value and a unique identifier is sent from a beacon device. The beacon authentication value is compared to a local verification value from a security algorithm at an administrative server for the beacon device, and a location service is unlocked based on the comparison.

Example Embodiments

A beacon device or a proximity beacon is a small electronic device that emits a wireless single that may be detected by electronic devices in the nearby area of the proximity beacon. The beacon device may utilize one-way communication. The one-way communication may be radio frequency identification (RFID) in which the data is encoded by a coil of wire that creates a magnetic field or ultrasound pairing in which the data is modulated on a ultrasound signal. The beacon device may utilize a low power ad hoc wireless protocol such as Bluetooth Low Energy. Because of the low power requirements, the beacon device may operate for months or years on a small coin cell battery. One or more user devices may receive the wireless signal from the beacon device. The wireless signal includes data indicative of the identity of the beacon device and/or the location of the beacon device. The proximity beacon may be tied to specific geographic locations or relative locations.

In some applications, beacon devices may be used in stores or other retail settings to provide advertisements, offers, or product information to nearby consumers. For example, a proximity beacon may be mounted near a shelf containing products. When a user device nearby is running a particular mobile application, the beacon device emits information to the user device. In some cases, the information provides the price of the product or offers a discount on the product. In some cases, the information provides the identity and/or location of the beacon device, which triggers the mobile application to retrieve and provide promotional information or a discount for the product. Favorable offers may be given for customers who are present during particularly sought after sale times such as in the morning hours of a shopping holiday (e.g., Black Friday).

In some instances, certain users may desire to be physically present in multiple stores at the same time to take advantage of the discounts. For example, someone may desire purchase as many products as possible at deep discount in order to resale the products at a profit. It may be possible to record the wireless signal in order to spoof, or rebroadcast the wireless signal in an unauthorized location or time, one or more of the beacon devices.

The following embodiments providing security algorithms for the beacon devices that prevent spoofing or rebroadcasts of the wireless signals at unauthorized locations or times. The security algorithms may include variable passwords that change over time. Even without bidirectional communication between the beacon device and the mobile device, the variable passwords follow a predictable sequence (e.g., time based or transaction based) that is only known to the beacon devices and the mobile application.

Figure 1:
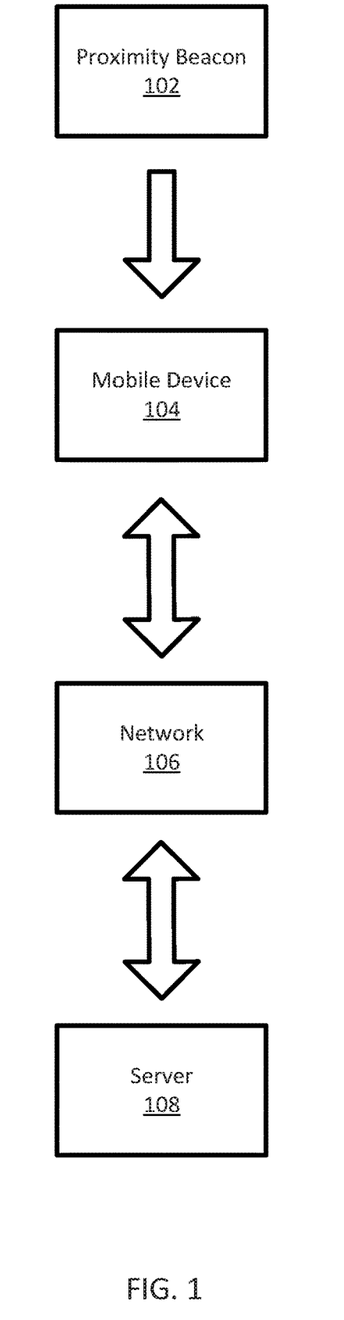
FIG. 1 illustrates an example system for operating a proximity beacon.

FIG. 1 illustrates an example system for operating a proximity beacon. The system includes a proximity beacon 102, a mobile device 104, and a network 106 connected to a server 108. Additional, different, or fewer components may be included. For example, multiple mobile devices and/or proximity beacons may be included.

The proximity beacon 102 is configured to transmit a beacon signal. The beacon signal may be a radio frequency (RF) signal at a predetermined frequency. The predetermined frequency may be one or more channels in the range of 2.0 GHz to 2.5 GHz. The beacon signal may be transmitted in one or more channels having a specific width (e.g., 1 MHz or 2 MHz). The beacon signal may be transmitted using Gaussian frequency shift modulation. The beacon signal may have a predetermined bit rate (e.g., 1 Mbit/s), and a maximum transmit power (e.g., 10 mW).

The frequency may depend on a configuration setting. The selected frequency may be based on country or another jurisdiction. The frequency may be selected to avoid interference in the radio spectrum. The beacon signal may also be adjusted in power according to a configuration setting. A high power setting may be selected to increase the distance range of the proximity beacon 102. A low power setting may be selected to conserver power or battery life. The beacon signal may also be adjusted in rate or cycle. That is the interval at which the proximity beacon 102 emits the beacon signal may be adjusted according to a configuration setting. A low repeat rate conserves power, and a high repeat rate increases the likelihood that the mobile device 104 receives the beacon signal. For example, if the mobile device 104 is moving, the mobile device 104 may enter and leave the range of the proximity beacon between beacon signals. Any of the configuration settings may be made directly to the proximity beacon 102 (e.g., dip switches or button) or through a connection with an administrative device. The proximity beacon 102 may include a port (e.g., universal serial bus or another serial bus) for connecting the administrative device to the proximity beacon 102 in order to transmit the configuration settings to the proximity beacon 102.

The beacon signal may be encoded with one or more identifiers. The identifiers may include a universally unique identifier (UUID). The UUID may be a 16 bit to 128 bit number or hexadecimal sequence. The UUID may be partially formed of a serial number for the proximity beacon 102. The UUID may also indicate the manufacturer of the proximity beacon 102. In some examples, each proximity beacon may have a different UUID. In others, the proximity beacons in a particular implementation or a particular location may share the same UUID. In addition, or in the alternative the identifiers may include the geographic location of the beacon device 102.

The identifiers may also include a major code and a minor code. The major code and minor code may include one or more alphanumeric characters encoded in the beacon signal. For example, the characters may be pulse width modulated to form the beacon signal. The major code may designate a first subset of a deployment of proximity beacons. The major code may be used in multiple proximity beacons in a portion of a venue. For example, the major code may be used in proximity beacons in a particular department or aisle of a store. The minor code may designate a second subset of the deployment of proximity beacons. The minor code may be used for individual proximity beacons or a smaller group of proximity beacons than the major code. For example, the minor code may be specific to a particular product or shelf in the store. The major code and/or minor code may be non-unique identifiers. That is, the major and minor codes may have a number of bits that is less than the UUID. In one example, the major and minor codes may comprise eight bits. The major and minor codes may only be distinguishable from the other major and minor codes in the deployment.

The proximity beacon 102 may include a dip switch, dial, or other input device for adjusting the major code and/or the minor code. Alternatively, the major code and/or minor code may be programmed using the administrative device in communication with the proximity beacon 102.

The mobile device 104 receives the beacon signal from the beacon device 102. The mobile device 104 includes a transceiver configured to communicate using the predetermined frequency of the beacon signal. The mobile device 104 may be configured to convert a pulse width modulated signal to digital data. The data may include any of the identifiers (e.g., unique identifier, major identifier, and minor identifier).

The data may include a security code or a beacon authentication value. The beacon authentication value may be calculated by the proximity beacon 102 using a security algorithm. The beacon authentication value may be a transient value or a temporary value that changes incrementally. The beacon authentication value may begin at an initial value or seed value. The change in the beacon authentication value may be based on time. For example, every predetermined time period, the beacon authentication value may increment to the next value in a series of values. The beacon authentication value may increment in response to the predetermined time period passing according to a system clock. For example, when the predetermined time period is five minutes, the beacon authentication value initially has value V1, increments to value V2 after five minutes have passed, increments to value V3 after ten minutes have passed, and so on. The beacon authentication value may increment sequentially regardless of time. For example, the beacon authentication value may increment for each instance that the beacon authentication value is accessed. That is, the first time the beacon authentication value is accessed, the value is V1. When the beacon authentication value is accessed again, the value increments to V2.

In response to receipt of the beacon signal, the mobile device 104 generates a service request and transmits the service request to the server 108. The service request includes the beacon authentication value determined by the proximity beacon 102. The server 108 performs a calculation similar to that of the proximity beacon 103 using a security algorithm to generate a local verification value that matches the beacon authentication value. In some examples, the local verification value increments based on time. The proximity beacon 102 and the server 108 may include clocks that are synchronized. In other examples, the local verification value increments for each usage. The local verification value should increment at the same interval that the beacon authentication value increments.

The server 108 calculates the local verification value and compares the local verification value to the beacon authentication value received in the service request from the mobile device 104. The server 108 performs a comparison of the authentication value to the local verification value. The server 108 determines whether the local verification value matches the beacon authentication value. In some instances, the server 108 determines whether there is an exact match between the local verification value and the beacon authentication value. The server 108 may determine whether there is a partial match between the local verification value and the beacon authentication value. For example, the server 108 may determine whether a predetermined number or a predetermined percentage. For example, the server 108 may determine whether a number (e.g., 3, 5, 10, or another number) of the alphanumeric characters of the local verification value match the beacon authentication value, or the server 108 may determine whether a percentage (e.g., 50%, 80%, or another percentage) of the alphanumeric characters of the local verification value match the beacon authentication value.

In addition or in the alternative, the beacon authentication value and the local verification value may be encrypted. Various encryption techniques may be used such as public and private key encryption, a cryptographic hash function, or a key exchange.

The beacon authentication value and the local verification value may be one-time passwords. The one time password may follow a predetermined pattern but also includes an element of randomness or pseudo randomness. For example, with a time synchronized one time password may be based on a security token hardware that is included in the proximity beacon 102 and also included at the server 108.

Alternatively, the one-time password may also be partially based on a past password. For example, first, a seed value or starting value is selected. Second, a hash function is applied repeatedly (e.g., 100 or 1000 times) to the seed value. A hash function f( ) applied to seed value s may be described as f(s), and applied one hundred time as $f_{100}(s)$. The passwords may be replied in reverse order. Thus, first $f_{100}(s)$ is used, then $f_{99}(s)$, and so on.

When the local verification value and the beacon authentication value match exactly, based on the predetermined number of alphanumeric characters, or based on the predetermined percentage of alphanumeric characters, the server 108 determines that the mobile device 104 is actually geographically near the proximity beacon 102. In response, the server 108 may provide a location service based on the comparison being a match (e.g., substantial match). That is, the server 108 may release data to the mobile device 104 in response to the match. Alternatively, the server 108 may generate a confirmation message to the mobile device 104 that informs the mobile device 104 that the proximity beacon 102 is actually nearby. In response, the mobile device 104 may provide the location service. The server 108 may generate a spoof warning when the comparison is not a match (e.g., not a substantial match).

The network 106 may connect the mobile device 104 to the Internet or one or more servers 108. The server 108 may provide information to the mobile device 104 in response to the mobile device 104 matching the local verification value and the beacon authentication value. The mobile device 104 may request the information based on matching the local verification value and the beacon authentication value. The mobile device 104 may send the UUID, major code, or minor code to the server 108, and the server 108 may query a lookup table to match the proximity beacon 102 with information.

The information may include promotional information for a good or service provided near the proximity beacon 102. The information may include a time-dependent discount for the good or service. The information may describe the good or service. For example, a shoe store may include proximity beacons for selected varieties of shoes. Once the mobile device 104 forwards the identifiers to the server 108, which returns information for those shoes.

Figure 2:
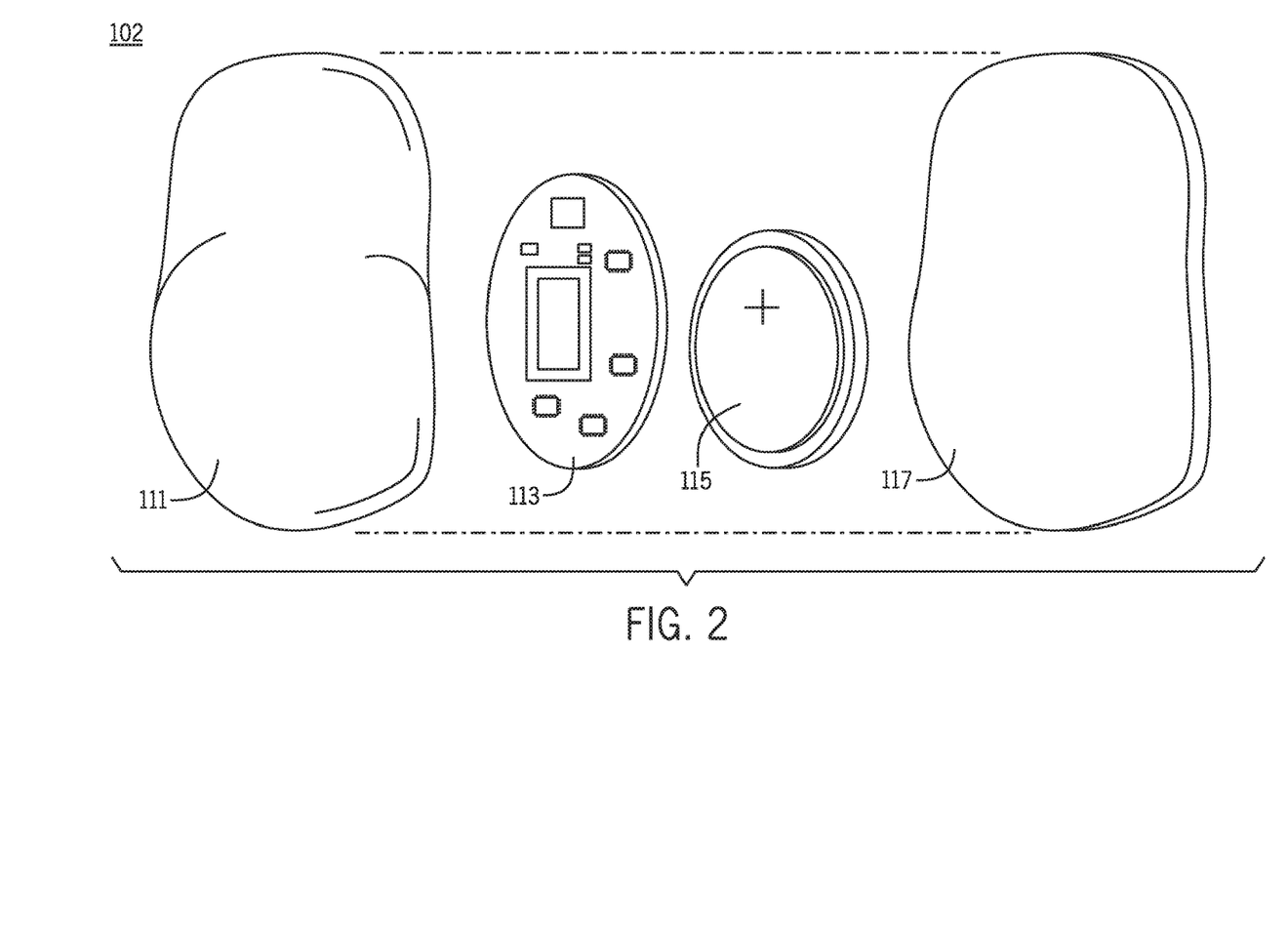
FIG. 2 illustrates an example proximity beacon.
Figure 3:
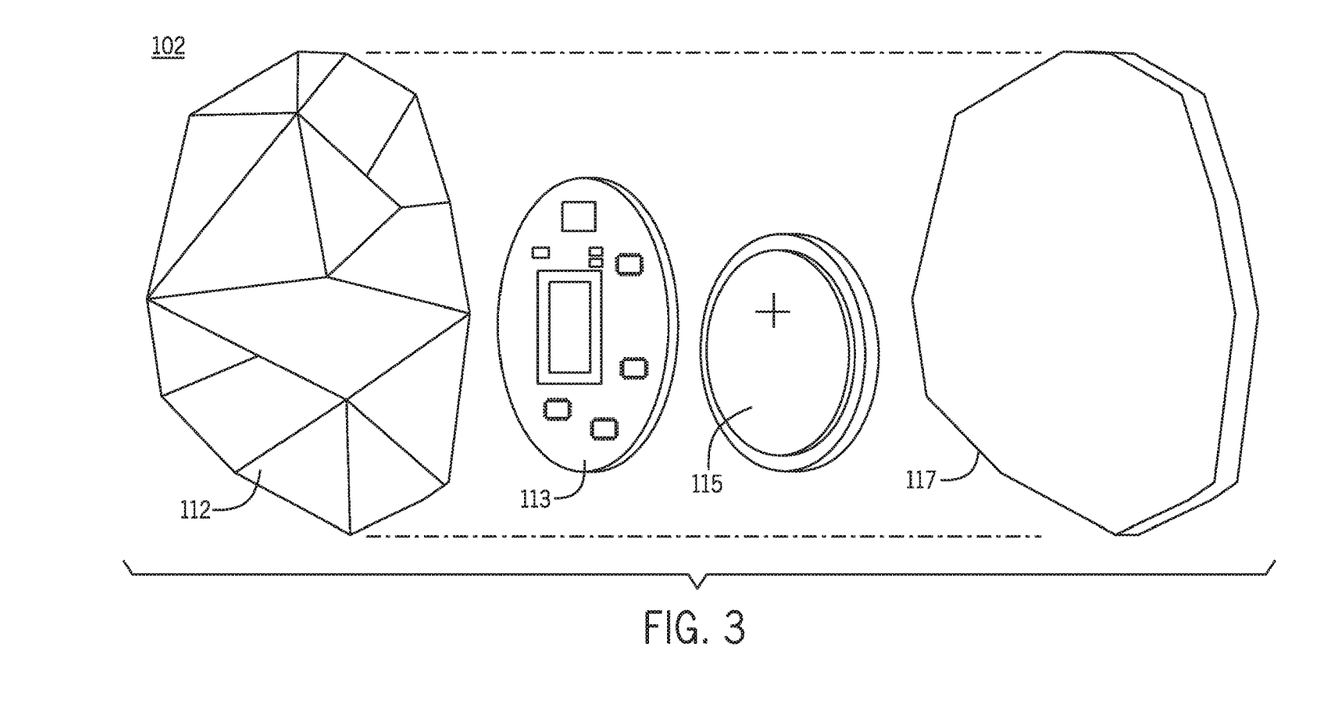
FIG. 3 illustrates another example proximity beacon.
Figure 4:
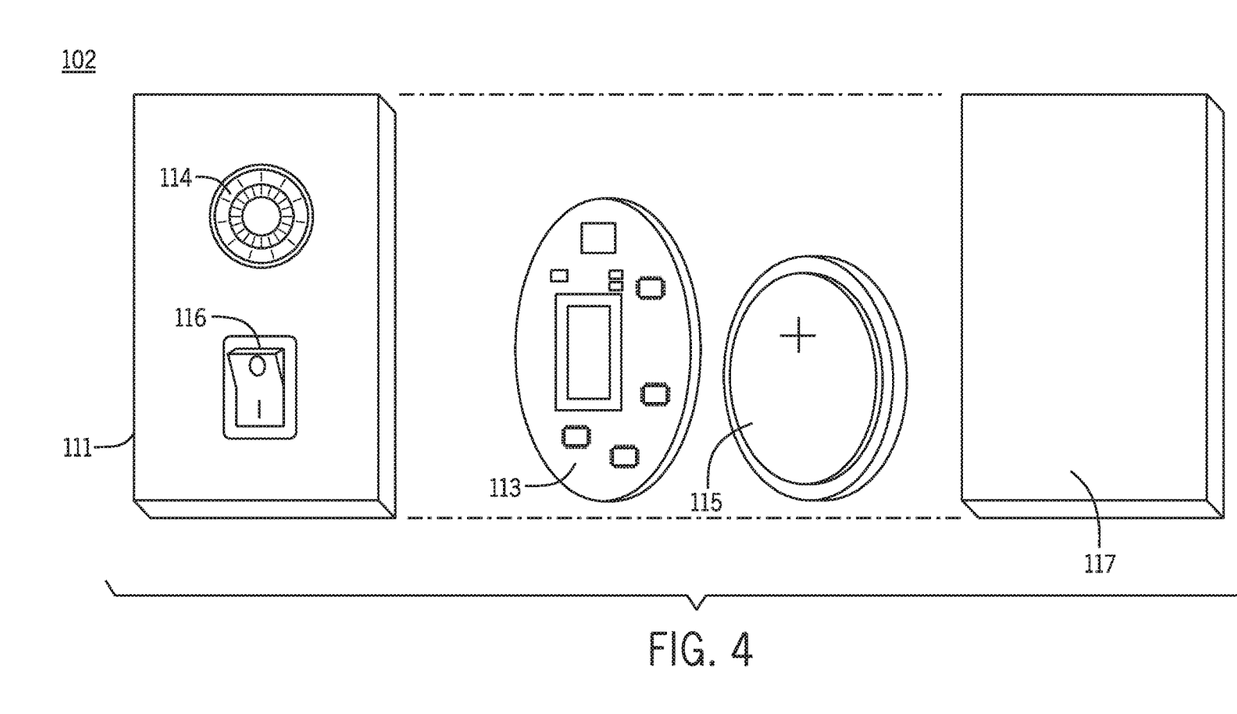
FIG. 4 illustrates another example proximity beacon.

FIGS. 2, 3 and 4 illustrate an example proximity beacon 102. The proximity beacon 102 comprises a casing 111, a circuit board 113, a battery 115, and a support mount 117. Additional, different or fewer components may be included.

The casing 111 may be formed of plastic, or any other material permeable to radio signals, and take a variety of shapes. As shown in FIG. 2, the casing 111 may have a curved surface or egg-shaped. As shown in FIG. 3, the casing 111 may be multi-faceted with multiple polygonal faces. As shown in FIG. 4, the casing 111 may be a rectangular prism. The casing may include a latching mechanism for attaching and removing the support mount.

The circuit board 113 may include a processor, a memory, and communication circuitry mounted on and electrically coupled to a printed circuit board. The memory may store one or more of the identifiers such as the UUID, the major code, and the minor code. The processor may encrypt and encode the identifiers into the beacon signal, which is transmitted using the communication circuitry.

The battery 115 may be coin battery shaped as a disc. The battery 115 may have a lifetime of a month, a year, or more. The battery 115 may rechargeable. The battery 115 may be held in place by latching the casing 111 to the support mount 117.

As shown in FIG. 3, the casing 111 may include an indicator 112. The indicator 112 may be a light emitting diode (LED) or another type of light that is lit by the processor and the battery 115. The indicator 112 may be lit in response to power being supplied to the processor from the battery 115. The indicator may be lit to indicate when the communication circuitry is transmitting. In other examples, the indicator 112 may include multiple lights or a single light that emits multiple colors. One color may indicate power and functioning normal, another color may indicate an error has occurred, and a third color may indicate that the battery 115 is low.

As shown in FIG. 4, the casing 111 may include one or more controls such as a dial 114 and a power switch 116. The dial 114 may have multiple settings for the identifiers that are transmitted by the communication circuitry. One or more of the dial settings may include a scheme for providing the UUID, major codes, and minor codes. For example, each dial setting '1', '2' and so on may be a different UUID. In addition, or in the alternative, each dial setting may correspond to a major code or a minor code. In one example, each of the dial settings '0' to '10' corresponds to a combination of an UUID, a major code, and a minor code. The dial 114 may be electrically connected to a variable resistor that regulates an input to control logic connected to the processor. The power switch 116 may turn to proximity beacon 102 on or off by connecting or disconnecting the batter 115. A port 118 may also be included in the alternative or in addition to the manual control inputs.

Figure 5:
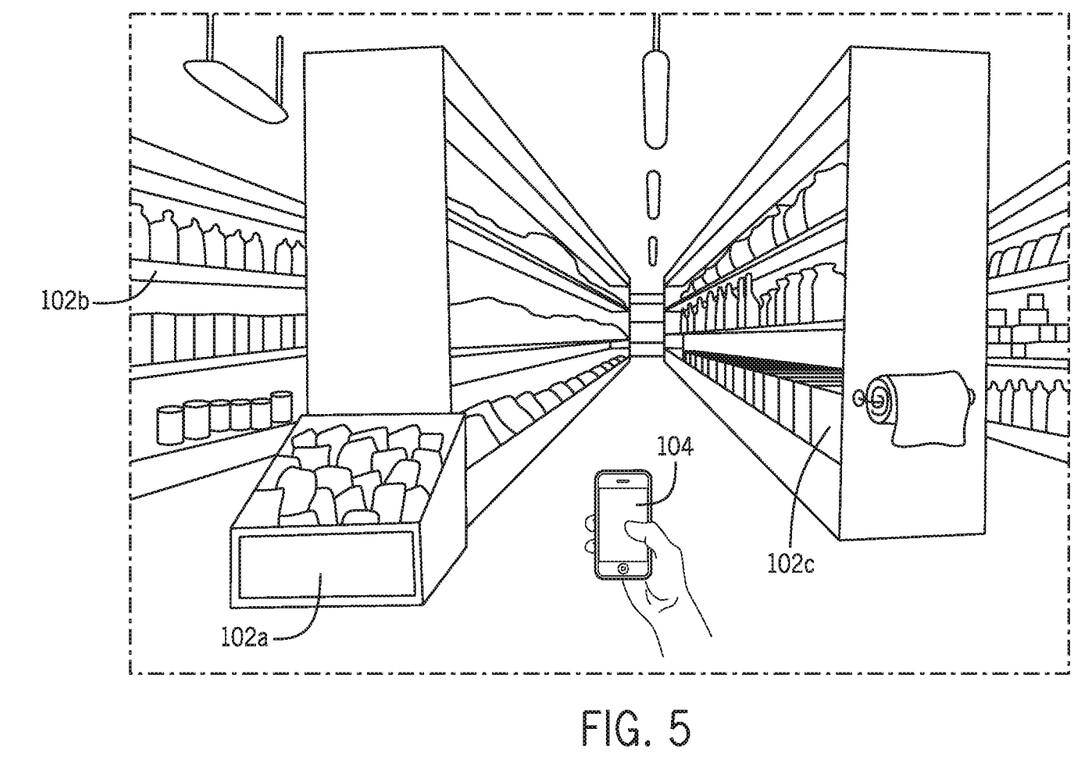
FIG. 5 illustrates an example retail setting for proximity beacons.

FIG. 5 illustrates an example retail setting for proximity beacons. The retail setting includes multiple aisles and multiple shelves within each aisle. The shelves hold various products. Proximity beacons may be attached to a shelf, as shown by proximity beacon 102b. Proximity beacons may be attached a standalone display unit, as shown by proximity beacon 102a. Proximity beacons may be attached to individual products, as shown by proximity beacon 102c, placed in either on the shelves or on the standalone display unit.

When a user enters the retail setting with the mobile device 104, the mobile device 104 may detect one or more proximity beacons nearby. The mobile device 104 may display a list of the available proximity beacons (e.g., beacons 102a-c) either by identifier or by associated product. For example, the mobile device 104 may display a list including multiple product names either by generic descriptors or by brand. Prices and/or promotional discounts may be displayed on the list.

Figure 6:
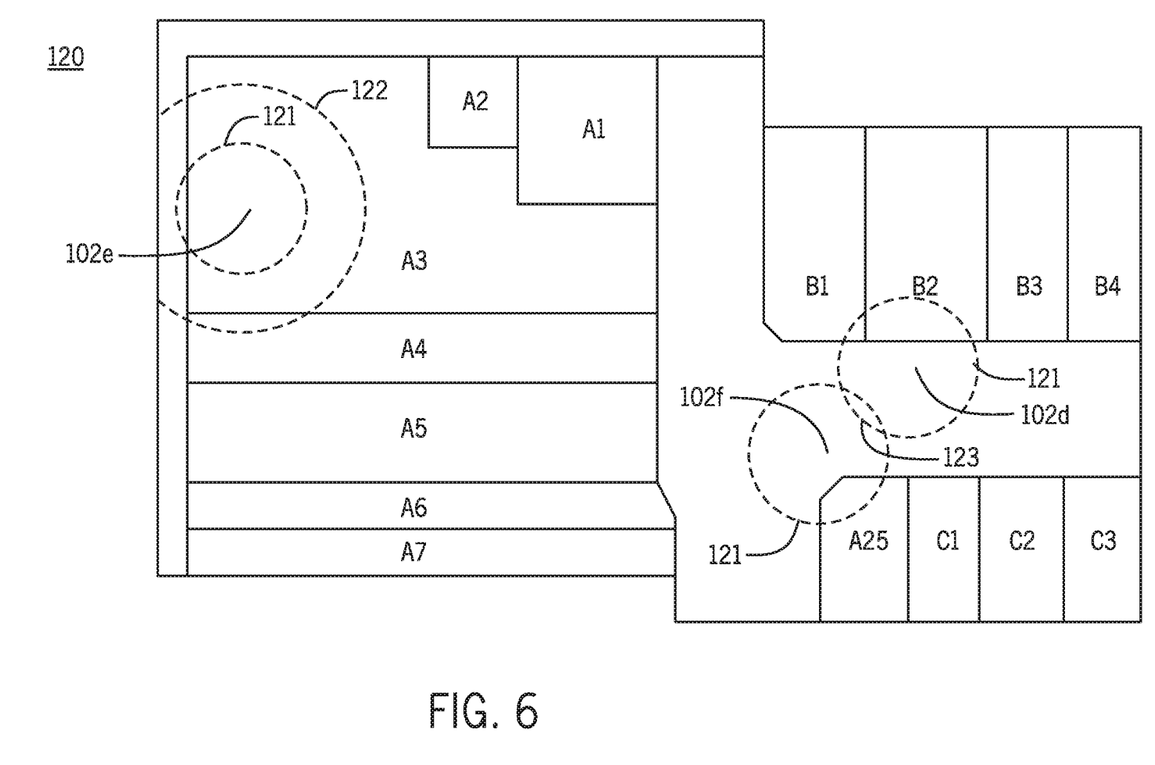
FIG. 6 illustrates an example floor plan for proximity beacons.

FIG. 6 illustrates an example floor plan 120 for proximity beacons. The floor plan 120 may correspond to a building, a school, a mall, an underground shopping area, an outdoor shopping area, or another floor plan. For illustrative purposes, various room are depicted on floor plan 120 include rooms A1-A7, B1-4, and C1-3. The rooms may be retail outlets. Proximity beacons 102*e-f* may be strategically placed in areas near the retail outlets. Each of the proximity beacons 102*e-f* is associated with a broadcast area or broadcast range 121. In some examples, the broadcast ranges 121 may overlap, as shown by overlapping range 123. The broadcast ranges 121 may have different sizes. Examples diameters for the broadcast range 121 include 10 meters, 25 meters, 50 meters, and 100 meters. In some examples, as illustrated for proximity beacon 102*e*, an extended range 122 may be available according to a user input. The extended range may be available because of a higher power setting for the transmitter.

Figure 7:
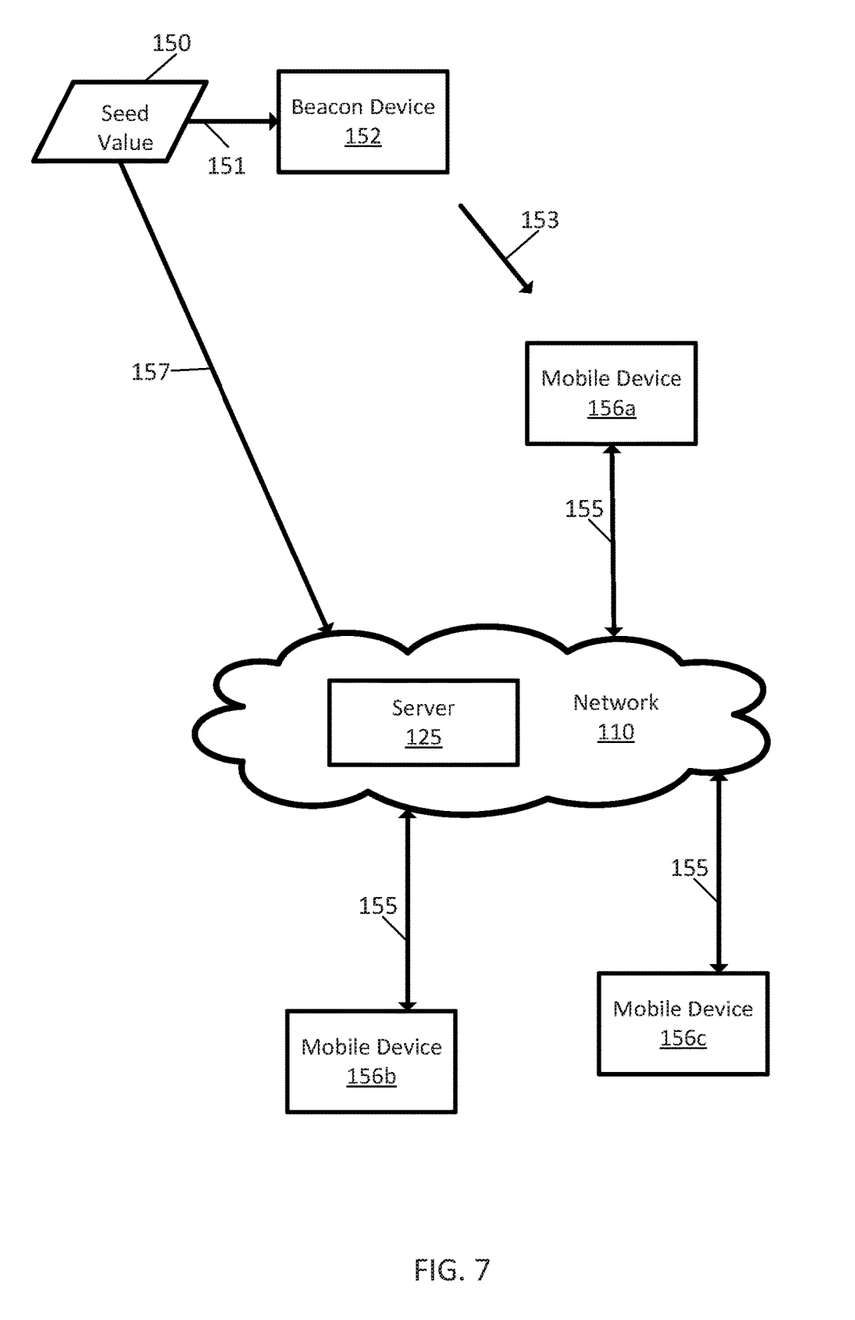
FIG. 7 illustrates an example network for proximity beacons.

FIG. 7 illustrates an example network for proximity beacons. In this example, multiple mobile devices 156*a-c* are in communication with network 110 and server 125. Only beacon device 152 is shown, but multiple beacon devices may be used. Additional, different, or fewer components may be included.

The beacon device 152 receives a seed value 150 through one way communication channel 151. The seed value 150 may be received through a physical connection (e.g., a USB port or another serial connection) made with a programming device (e.g., a laptop or tablet computer). The seed value 150 may correspond to a current system time of the programming device or a network to which the programming device is connected. For example, the seed value 150 may be the current time in minutes concatenated with a random number. The seed value 150 may be determined in response to a connection of the communication channel 151 or powering up the beacon device 152. The beacon device 152 may increment the seed value in a variety of techniques. In one example, the seed value 150 may be incremented by a value n every predetermined amount of time. Examples for n include 1, 2, 10, or any value. Examples, for the predetermined amount of time include 1 second, 10 seconds, 1 minute, and 10 minutes. The administrator may select the predetermined amount of time as a security setting. That is, the smaller the time increment, the more secure the system is to spoofing.

The seed value 150 may also be communication to the network 110 and/or server 125 via the communication path 157. The communication path 157 may be a wireless connection such as WiFi or the family of protocols known as 802.111 or a cellular connection. The server 125 may store the seed value and increment the seed value in unison with the beacon device 152. In other words, a counting or increment algorithm is executing by the beacon device 152 and the server 125 in order to implement a one-time password. The beacon device 152 sends the incremented seed value through one way communication path 153 to the mobile device 156*a*, which forwards the incremented seed value to the server through communication path 155. The server 125 is configured to authenticate or match the beacon device 152 by comparing the version incremented by the server 125 and the version received from the mobile device 156*a*. The server 125 may apply a delay or time window or grace period in order to account to the time that has passed for the communication paths 153 and 155. In other words, the server 125 may match the incremented value received from the mobile device 156*a* to a past value or a range of past values incremented at the server. The past value or range of past values may be selected according to the grace period or time window.

Other mobile devices 156*b-c* may be in communication with the network 110. The other mobile devices 156*b-c* may be in communication with other beacon devices that may increment seed value 150 or another seed value. Thus, the server 125 may simultaneously increment multiple seed values and store multiple seed values for multiple beacon devices. Accordingly, mobile devices in communication with multiple beacon devices may store multiple incremented seed values.

Once the incremented seed value have been authenticated. The mobile device 156*a* receives content for beacon device 152 from the server 125. The mobile device 156*a* may send an identifier (e.g., any combination of a UUID, a major code, and a minor code) received in the beacon signal from the beacon device 152 to the server 125. The server receives the identifier and access a lookup table in order to determine the data or file to send to the mobile device 156*a*.

Figure 8:
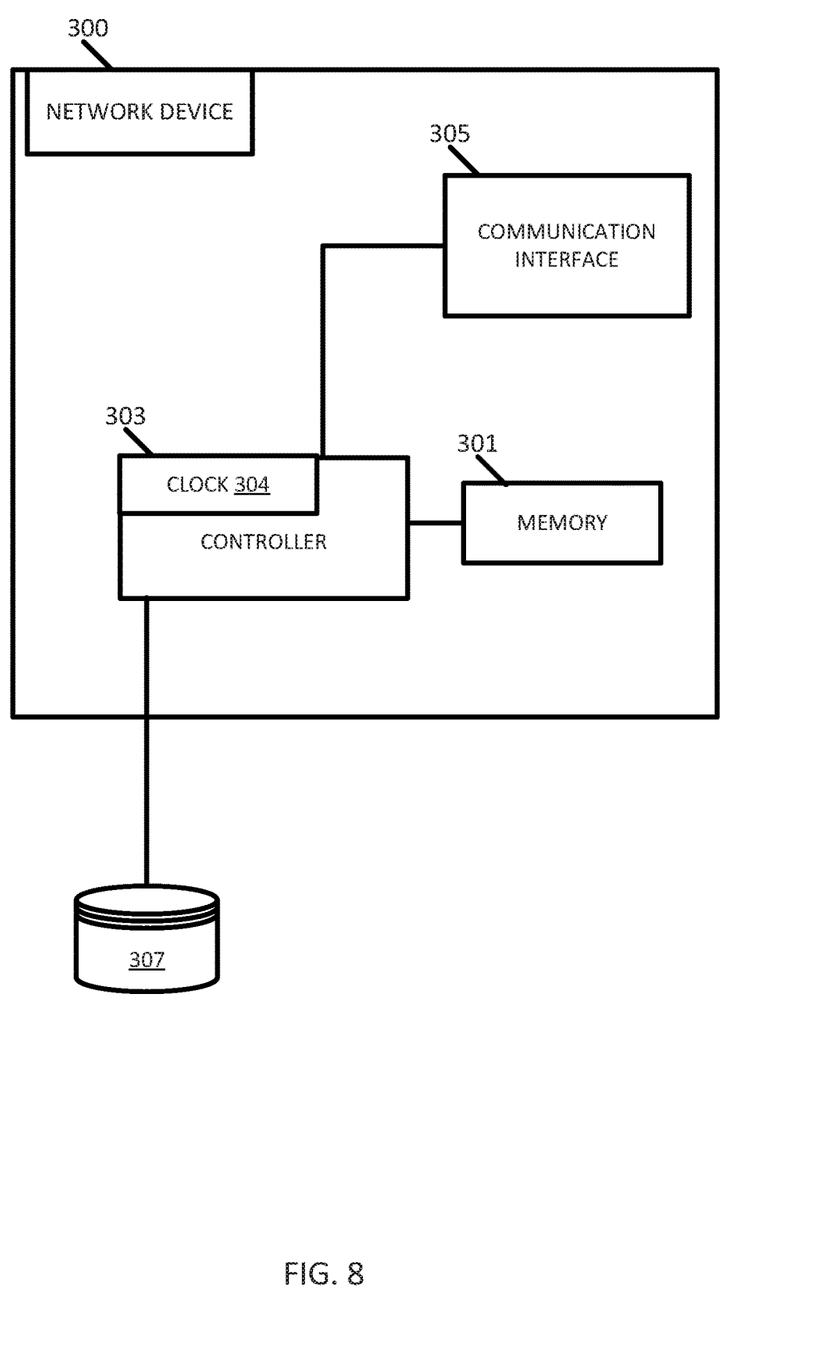
FIG. 8 illustrates an example network device for preventing spoofing of proximity beacons.
Figure 9:
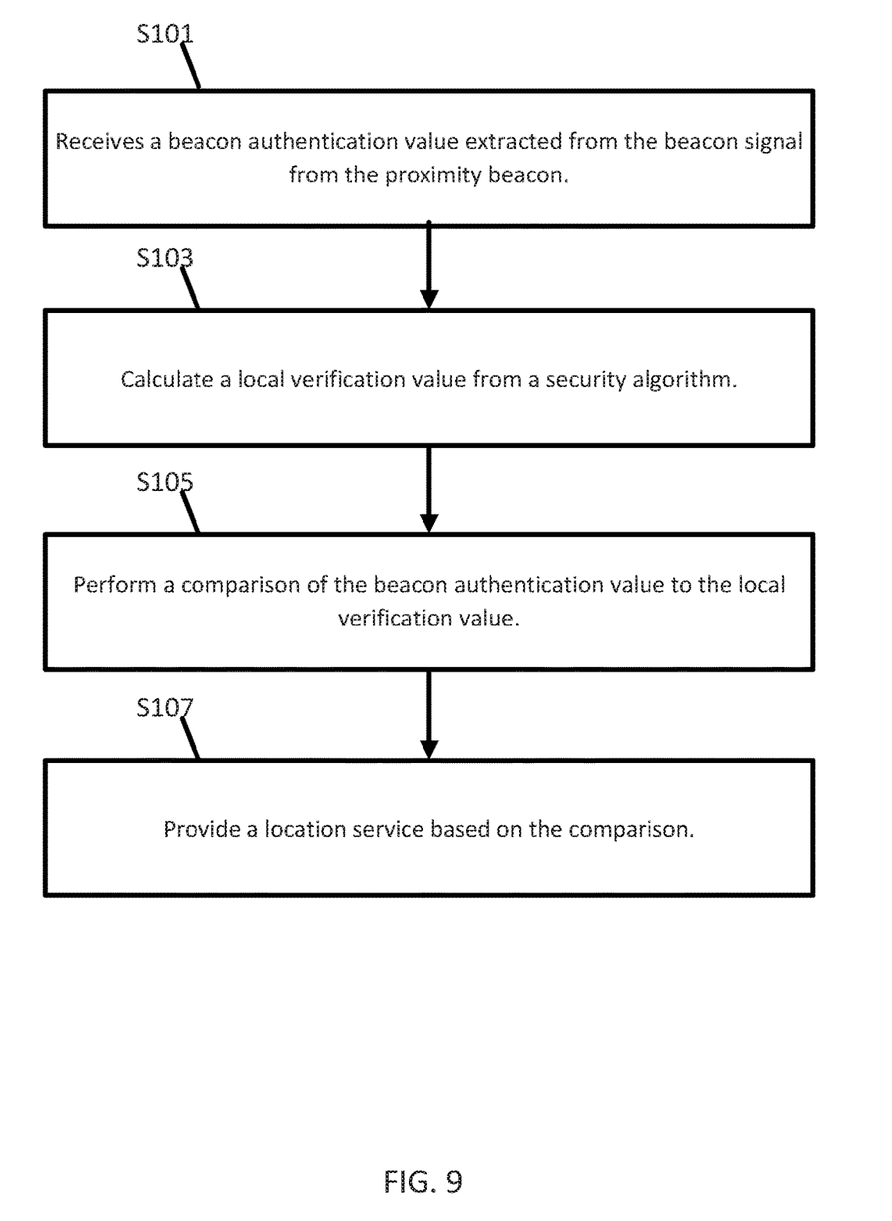
FIG. 9 illustrates an example flowchart for the network device of FIG. 8.

FIG. 8 illustrates an example network device 300 (e.g., server 125) for the prevention of proximity beacon proofing. The network device includes at least a memory 301, a controller 303, and a communication interface 305. The network device 300 may be in communication with database 307. Additional, different, or fewer components may be provided. Different network devices may have the same or different arrangement of components. FIG. 9 illustrates an example flowchart for the prevention of beacon spoofing using the network device of FIG. 8. Additional, different, or fewer acts may be provided. The acts are performed in the order shown or other orders. The acts may also be repeated.

As described above, the proximity device 102 generates a beacon signal that identifies the proximity device 102 and includes a beacon authentication value determined at the proximity device 102. A mobile device 104, such as a smartphone, a laptop computer, or a tablet computer, which extracts from the beacon signal and then relays the beacon authentication value and the identifier for the proximity device 102. At act S101, the controller 303 or the communication interface 305 receives a beacon authentication value extracted from the beacon signal from the proximity beacon. The communication between the mobile device 104 may be any network connection such as a cellular network or a wireless network.

At S103, the controller 303 calculates a local verification value from a security algorithm. The security algorithm may parallel the generation of the beacon authentication value. The security algorithm may calculate the local verification value from an initial value a clock value received from clock 304. The security algorithm may include a hash function that repeats every predetermined time interval. The predetermined time interval may be long enough to account for the communication between the proximity beacon 102, the mobile device 104, and the network device 300. Thus, the controller 303 may compare the received beacon authentication value to a current value output from the security algorithm or a previous value generated with the predetermined time period.

At act S105, the controller 303 performs a comparison of the beacon authentication value to the local verification value. The comparison may require an exact match. That is, each character of the beacon authentication value is compared to a corresponding character of the local verification value. In one example, the comparison may only require a subset of characters to match between the beacon authentication value and the local verification value. Examples of the subset may include a percentage such as 60%, 80% or 90% or a specific number of characters. Using the percentage, it is possible for minor transmission error not to disrupt the comparison.

At act S107, the controller 303 and the communication interface 305 provide a location service based on the comparison. The controller 303 may identify a unique identifier for the proximity beacon from the beacon signal, and the location service is based on the unique identifier. In one implementation the unique identifier describes a retail outlet or a portion of the retail outlet. When the comparison shows that there is not a match, the controller 303 may generate a spoof warning. The spoof warning include the identifier for the proximity beacon 102. The communication interface 305 may be sent to the administrator of the deployment of the beacons. In response to the spoof warning, the administrator may disable the proximity beacon 102. In one example, the controller 303 removes the identifiers for the proximity beacon that has been spoofed so that no future location services are applied for that proximity beacon. In another example, a service technician may be deployed to change the identifiers of the spoofed proximity beacon.

Figure 10:
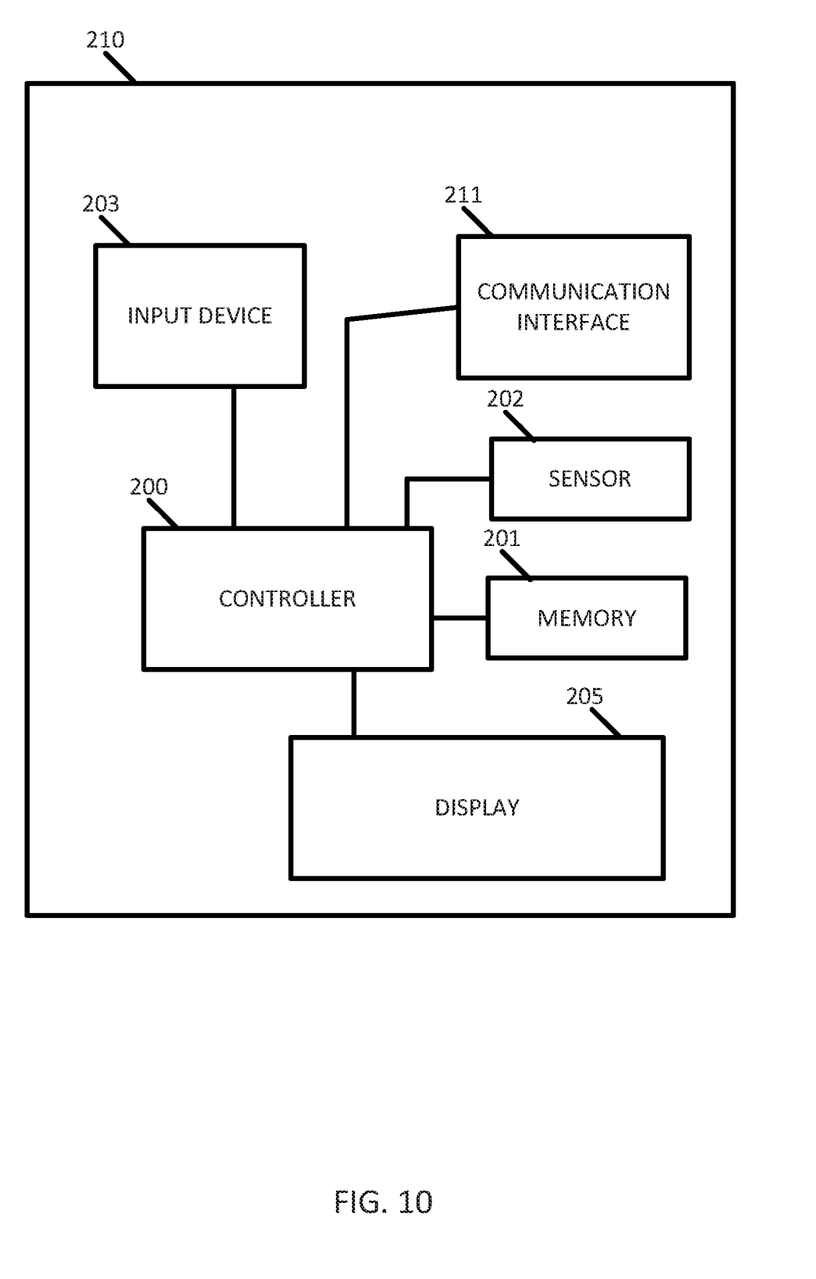
FIG. 10 illustrates an example endpoint device for communication with one or more proximity beacons.
Figure 11:
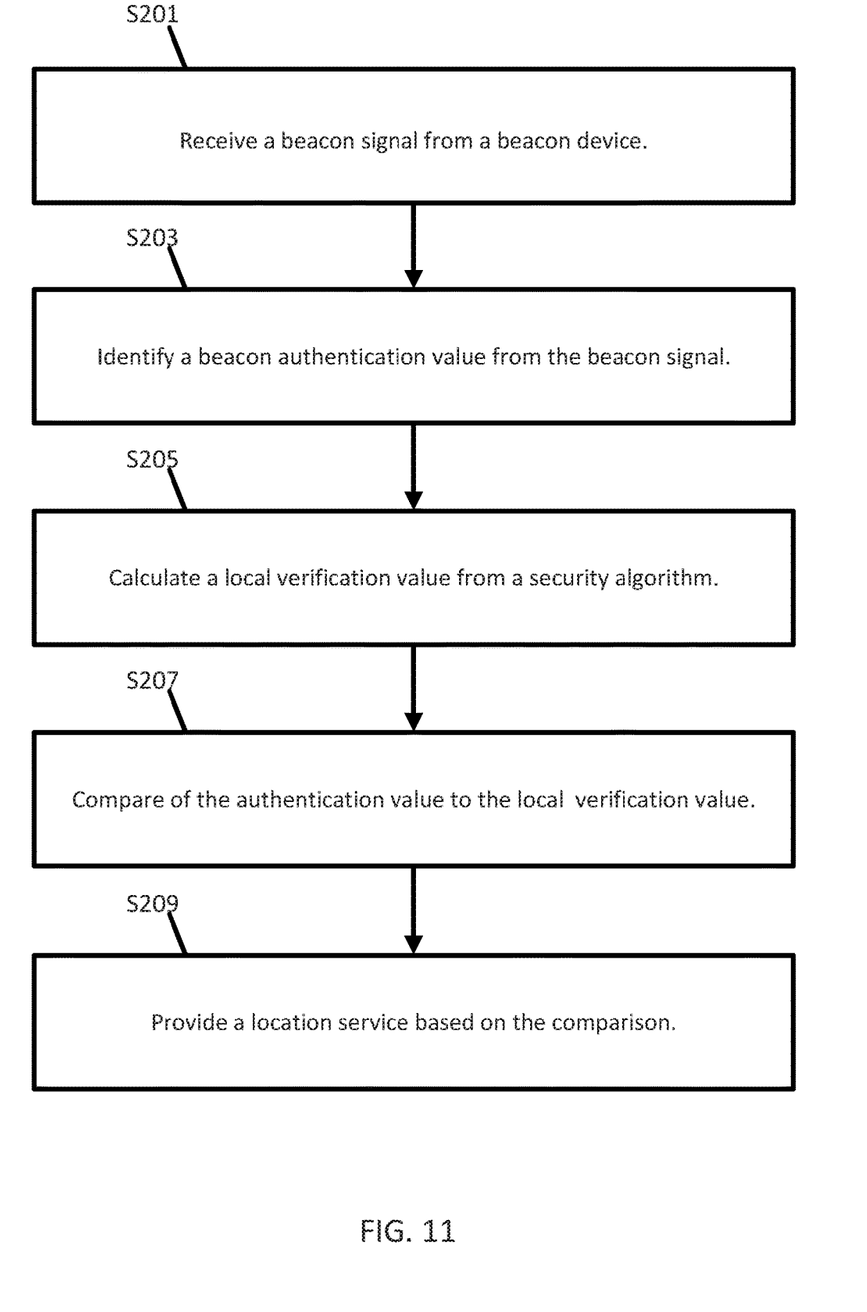
FIG. 11 illustrates an example flowchart using the endpoint device of FIG. 10.

FIG. 10 illustrates an example endpoint device for preventing spoofing in communication with one or more proximity beacons. The endpoint device 210 may include a controller 200, a memory 201, a sensor 202, an input device 203, a sensor 204, a communication interface 211 and a display 205. Additional, different, or fewer components may be provided. Different network devices may have the same or different arrangement of components. FIG. 11 illustrates an example flowchart using the endpoint device 210 of FIG. 10. Additional, different, or fewer acts may be included.

At act S201, the communication interface 211 receives a beacon signal from a beacon (e.g., proximity beacon 102 or beacon device 152). At act S203, the controller 200 identifies a beacon authentication value from the beacon signal. The controller 200 may identify a non-unique identifier for the beacon device from the beacon signal. The non-unique identifier may describe the location of the beacon. In one example, the non-unique identifier describes two levels of location. One level may be a large area (e.g., a store) and another level may be a particular portion of the large area (e.g., an aisle or shelf). Thus, the non-unique identifier may include a first value indicative of a first area and a second value indicative of a second area, such that the second area is a subset of the first area. The receipt of the beacon signal or identifiers for the beacon may be shown on display 205.

At act S205, the controller 200 calculates a local verification value from a security algorithm that matches the algorithm performed by the beacon. The security algorithm may be any of the examples described herein. At act S207, the controller 200 compares the authentication value to the local verification value. Thus, the authentication is performed by the endpoint device 210.

In one alternative, the sensor 104 may determine a location of the endpoint device 120. The sensor 104 may be a global positioning system (GPS) sensor or an inertial sensor for determining the geographic location of the endpoint device 210. The controller 200 may match the location of the endpoint device 210 with the location of the beacon to provide another level of authentication that the beacon is not being spoofed.

At act S209, the controller 200 provides a location service based on the comparison. The location service may information shown on display 205 that is interactive through input device 203. In some examples, the user requests the service via input device 203 and in others it is automatically pushed to the user upon authentication. The information from the location service may be stored memory 201 and unlocked in response to authentication (e.g., act S207). Alternatively, the endpoint device 210 may request the information for the location server from a server (e.g., network device 300 or server 125) in response to the authentication, which sends the information to the endpoint device 210. When the comparison shows that the beacon is not authenticated, the controller 200 may generate a spoof warning which is sent to an administrator (e.g., network device 300 or server 125).

In one alternative, the endpoint device 210 may provide information to an external device in response to the authentication. For example, the endpoint device 210 may provide demographic information or shopping preferences to the retailer. Thus, the proximity beacon may include an address, and the endpoint device 210 provides metadata to the address.

In one alternative, the endpoint device 210 may provide a game or puzzle to the user. For example, the beacon may be located near a queue or a line that forms in a store. In response to authentication this beacon, the endpoint 210 access an application as a distraction for the user.

In one alternative, the beacon is associated with a museum, art gallery, or historical site. The beacon signal includes a uniform resource locator (URL). The endpoint device 210 may visit the URL in order to download additional information for the exhibit in the museum, the artwork in the gallery, or the feature in the historical site. A series of beacons may be used to provide a self-guided tour.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The input device 203 may be one or more buttons, keypad, keyboard, mouse, stylist pen, trackball, rocker switch, touch pad, voice recognition circuit, or other device or component for inputting data to the endpoint 103. The input device 203 and the display 205 may be combined as a touch screen, which may be capacitive or resistive. The display 205 may be a liquid crystal display (LCD) panel, light emitting diode (LED) screen, thin film transistor screen, or another type of display.

The controllers 200 and 303 may include a general processor, digital signal processor, an application specific integrated circuit (ASIC), field programmable gate array (FPGA), analog 130 circuit, digital circuit, combinations thereof, or other now known or later developed processor. The controller 303 may be a single device or combinations of devices, such as associated with a network, distributed processing, or cloud computing.

The memories 201 and 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The memories 201 and 301 are non-transitory computer-readable media, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   at a server configured to communicate with a mobile device over a network:
   receiving, from the mobile device, information derived by the mobile device from a proximity beacon signal transmitted to the mobile device by a beacon device, the information including: a unique identifier representing a serial number of the beacon device; non-unique identifiers including a major code indicative of a first location area and a minor code indicative of a second location area that is a subset of the first location area; and a beacon authentication value that increments from an initial seed value based on time according to a security algorithm;
   incrementing a local verification value from the initial seed value based on a clock according to the security algorithm;
   performing a comparison of the beacon authentication value to a past incremented local verification value, instead of a current incremented local verification value, to account for time delays caused by transmission of the proximity beacon signal to the beacon device and transmission of the information from the mobile device to the server;
   if the comparison indicates a match, providing access to a location service based on at least one of the unique identifier and the non-unique identifiers, and providing the location service to the mobile device based on the comparison; and
   if the comparison does not indicate a match, removing the unique identifier received so that no location service is applied in the future for the beacon device.

2. The method of claim 1,
   wherein the location service is based on the unique identifier.

3. The method of claim 1, wherein the beacon authentication value is a one-time password.

4. The method of claim 1, wherein the local verification value increments sequentially.

5. The method of claim 1, wherein the initial seed value is applied to the beacon device through a serial interface.

6. The method of claim 1, wherein the local verification value and the beacon authentication value each include time values.

7. The method of claim 1,
   wherein the location service is based on the non-unique identifiers.

8. The method of claim 1, wherein the first location area corresponds to a retail outlet and the second location area corresponds to a shelf or aisle in the retail outlet.

9. The method of claim 1, further comprising:
   generating a spoof warning when the comparison indicates the beacon authentication value is different than the past incremented local verification value.

10. The method of claim 1, wherein the incrementing includes repeatedly applying a hash function to the seed value at periodic time intervals.

11. An apparatus comprising:
    a processor; and
    a memory comprising one or more instructions executable by the processor to perform:
    receiving, from a mobile device, information derived by the mobile device from a proximity beacon signal transmitted to the mobile device by a beacon device, the information including: a unique identifier representing a serial number of the beacon device; a major code indicative of a first location area, and a minor code indicative of a second location area that is a subset of the first location area; and a beacon authentication value that increments from an initial seed value based on time according to a security algorithm;

incrementing a local verification value from the initial seed value based on a clock according to the security algorithm;

performing a comparison of the beacon authentication value to a past incremented local verification value, instead of a current incremented local verification value, to account for time delays caused by transmission of the proximity beacon signal to the beacon device and transmission of the information from the mobile device to the server;

if the comparison indicates a match, providing access to a location service based on at least one of the unique identifier and the non-unique identifiers, and providing the location service to the mobile device based on the comparison; and if the comparison does not indicate a match, removing the unique identifier received so that no location service is applied in the future for the beacon device.

12. The apparatus of claim 11, wherein the location service is based on the unique identifier.

13. The apparatus of claim 12, wherein the major code corresponds to a retail outlet and the minor code corresponds to an aisle or shelf in the retail outlet.

14. The apparatus of claim 12, wherein the unique identifier is set by a manual dial or switch on the beacon device.

15. The apparatus of claim 11, wherein the beacon authentication value is a one-time password.

16. The apparatus of claim 11, wherein the initial seed value is applied to the beacon device through a communication interface.

17. A non-transitory computer readable medium including instructions that when executed are configured to cause a processor of a server to communicate with a mobile device over a network to perform:

receiving, from the mobile device, information derived by the mobile device from a proximity beacon signal transmitted to the mobile device by a beacon device, the information including: a unique identifier representing a serial number of the beacon device; a major code indicative of a first location area, and a minor code indicative of a second location area that is a subset of the first location area; and a beacon authentication value that increments from an initial seed value based on time according to a security algorithm;

incrementing a local verification value from the initial seed value based on a clock according to the security algorithm;

performing a comparison of the beacon authentication value to a past incremented local verification value, instead of a current incremented local verification value, to account for time delays caused by transmission of the proximity beacon signal to the beacon device and transmission of the information from the mobile device to the server;

if the comparison indicates a match, providing access to a location service based on at least one of the unique identifier and the non-unique identifiers, and providing the location service to the mobile device based on the comparison; and if the comparison does not indicate a match, removing the unique identifier received so that no location service is applied in the future for the beacon device.

18. The non-transitory computer readable medium of claim 17, wherein the location service is based on the unique identifier.

* * * * *